United States Patent
Lee et al.

(10) Patent No.: US 12,085,211 B2
(45) Date of Patent: Sep. 10, 2024

(54) COUPLING ASSEMBLY FOR BRANCHING PIPE

(71) Applicant: NEW ASIA Co., Ltd., Yeoju-si (KR)

(72) Inventors: Sang Heon Lee, Seoul (KR); Dong Il Han, Yeoju-si (KR)

(73) Assignee: New Asia Co., Ltd., Yeoju-si (KR)

( * ) Notice: Subject to any disclaimer, the term of this patent is extended or adjusted under 35 U.S.C. 154(b) by 27 days.

(21) Appl. No.: 17/760,444

(22) PCT Filed: Feb. 17, 2021

(86) PCT No.: PCT/KR2021/002035
§ 371 (c)(1),
(2) Date: Aug. 9, 2022

(87) PCT Pub. No.: WO2021/167351
PCT Pub. Date: Aug. 26, 2021

(65) Prior Publication Data
US 2022/0390054 A1    Dec. 8, 2022

(30) Foreign Application Priority Data

Feb. 17, 2020  (KR) .................. 10-2020-0019092
Apr. 10, 2020  (KR) .................. 10-2020-0043890

(51) Int. Cl.
*F16L 41/06* (2006.01)
*F16L 3/10* (2006.01)

(52) U.S. Cl.
CPC ............. *F16L 41/06* (2013.01); *F16L 3/1091* (2013.01)

(58) Field of Classification Search
CPC ................................ F16L 41/06; F16L 3/1091
See application file for complete search history.

(56) References Cited

U.S. PATENT DOCUMENTS 2,946,518 A * 7/1960 Wahlin ...................... B05B 1/14
                                                    239/266
4,073,513 A * 2/1978 Blakeley ................. F16L 41/12
                                                    285/136.1
(Continued)

FOREIGN PATENT DOCUMENTS

CN     102418827 A    4/2012
CN     106151742 A    11/2016
(Continued)

OTHER PUBLICATIONS

Office Action dated Sep. 13, 2023 in Japanese Application No. 2022-548709.
(Continued)

*Primary Examiner* — Kevin R Barss
(74) *Attorney, Agent, or Firm* — Knobbe, Martens, Olson & Bear, LLP

(57) ABSTRACT

The present invention relates to a coupling assembly for branching a pipe, and more specifically to a coupling assembly for branching a pipe, which can reduce assembly man-hours, has a simplified configuration, thus enabling a reduction in construction costs, and can effectively prevent the leakage of branched fluid even when the diameter of a branch hole formed in an inlet pipe is increased in order to increase a flow rate inside a branch pipe for supplying fluid to a sprinkler.

9 Claims, 28 Drawing Sheets

(56) References Cited

U.S. PATENT DOCUMENTS

| | | | | |
|---|---|---|---|---|
| 4,613,171 | A * | 9/1986 | Corcoran | F16L 41/12 |
| | | | | 277/606 |
| 2002/0000719 | A1* | 1/2002 | Kunsman | F16L 41/12 |
| | | | | 285/197 |
| 2010/0164226 | A1* | 7/2010 | Serizawa | F16L 3/1091 |
| | | | | 285/149.1 |
| 2012/0217354 | A1* | 8/2012 | Walraven | F16L 3/1091 |
| | | | | 248/74.1 |
| 2015/0300549 | A1 | 10/2015 | Cheng-Sheng et al. | |
| 2017/0122462 | A1* | 5/2017 | Langenbacher | F16L 3/221 |
| 2017/0122474 | A1* | 5/2017 | Borawski | F16L 17/02 |
| 2018/0266587 | A1* | 9/2018 | Booth | F16L 3/1075 |
| 2021/0324981 | A1* | 10/2021 | Lee | F16L 23/08 |
| 2022/0163147 | A1* | 5/2022 | Lee | F16L 21/002 |
| 2022/0235892 | A1* | 7/2022 | Lee | F16L 41/06 |
| 2022/0282810 | A1* | 9/2022 | Lee | F16L 23/08 |
| 2022/0373113 | A1* | 11/2022 | Lee | F16L 17/025 |

FOREIGN PATENT DOCUMENTS

| | | |
|---|---|---|
| JP | H04-083991 A | 3/1992 |
| JP | 2001-050461 A | 2/2001 |
| KR | 20-1998-0012589 U | 6/1998 |
| KR | 2002-0220053 Y1 | 4/2001 |
| KR | 10-0740590 B1 | 7/2007 |
| KR | 20-2007-0000842 U | 7/2007 |
| KR | 2009-0126156 A | 12/2009 |
| KR | 2013-0005001 U | 8/2013 |
| KR | 10-2155643 B1 | 9/2020 |
| KR | 10-2177888 B1 | 11/2020 |

OTHER PUBLICATIONS

International Search Report in PCT Application No. PCT/KR2021002035 dated May 7, 2021 in 3 pages.

Office Action in Chinese Application No. 202180011620.3 dated Apr. 3, 2024.

* cited by examiner

COUPLING ASSEMBLY FOR BRANCHING PIPE

TECHNICAL FIELD

The present invention relates to a coupling assembly for branching a pipe, and more specifically to a coupling assembly for branching a pipe, which can reduce assembly man-hours, has a simplified configuration, thus enabling a reduction in construction costs, and can effectively prevent the leakage of branched fluid even when the diameter of a branch hole formed in an inlet pipe is increased in order to increase a flow rate inside a branch pipe for supplying fluid to a sprinkler.

BACKGROUND ART

In general, sprinklers equipped with sensors are installed in each floor of constructions such as buildings or common houses for early extinguishing of a fire by sensing a fire and automatically sprinkling a high-pressure fluid when a fire occurs around ceilings.

To this end, a main pipe for supplying a fluid from the outside is installed, an inlet pipe in which a plurality of sprinklers are installed is installed in the main pipe, and a branch pipe for supplying a fluid to the sprinkler is installed in the inlet pipe.

However, conventionally, in order to install the inlet pipe and the branch pipe in communication with each other, the inlet pipe and the branch pipe are in fluid communication with each other by installing by a method of welding the branch pipe to a branch hole formed in the inlet pipe or respectively installing the inlet pipe and the branch pipe in a branched T-type pipe, but such a method requires a lot of assembly man-hours and a lot of parts, and thus, there is a problem in that construction costs are wasted.

In addition, when the diameter of a branch hole formed in the inlet pipe is increased in order to increase the flow rate of a fluid supplied to the sprinkler, there is a problem in that the fluid may leak.

Therefore, the situation is that there is a need for improvement of the above-described problems.

DISCLOSURE

Technical Tasks

In the technical problems to be solved in the present invention, an object of the present invention is to provide a coupling assembly for branching a pipe, which can reduce assembly man-hours and reduce construction costs by simplifying the configuration.

In addition, another object of the present invention is to provide a coupling assembly for branching a pipe, which can effectively prevent the leakage of branched fluid even when the diameter of a branch hole formed in an inlet pipe is increased in order to increase a flow rate inside a branch pipe for supplying fluid to a sprinkler.

The technical problems to be solved in the present invention are not limited thereto, and other technical problems that are not mentioned will be clearly understood by those skilled in the art from the following description.

Technical Solution

In order to solve the aforementioned technical problems, the coupling assembly according to the present invention includes an inlet pipe having a branch hole for branching an inflowing fluid, a branch pipe in communication with the inlet pipe to allow a fluid branched through the branch hole to flow therethrough, and a coupler which interconnects the inlet pipe and the branch pipe, wherein the coupler has an extension portion which passes through the branch hole and is inserted into the inlet pipe, and the inner diameter of the extension portion is the same as the inner diameter of the inlet pipe or greater than the inner diameter of the inlet pipe.

In this case, a support surface which is supported by the inner peripheral surface of the branch hole may be formed on the outer peripheral surface of the extension portion.

In this case, the outer diameter of the extension portion may be formed to be greater than the inner diameter of the inlet pipe, and the inner diameter of the branch hole may be formed to be the same as the outer diameter of the extension portion.

In this case, an insertion groove may be formed along the insertion direction of the extension portion on the inner peripheral surface of the inlet pipe and have the same inner diameter as the inner diameter of the branch hole.

In this case, the support surface may be inserted and supported in the insertion groove.

In this case, the coupler may be formed with a reinforcing bar for pressing the circumference of the outer peripheral surface of the inlet pipe.

In this case, the reinforcing bar may be formed with a pressing surface for pressing the circumference of the outer peripheral surface of the inlet pipe, and support walls that protrude in the radial direction of the inlet pipe may be formed on both sides of the pressing surface.

In this case, an insertion groove may be formed along the insertion direction of the extension portion on the inner peripheral surface of the inlet pipe and have the same inner diameter as the inner diameter of the branch hole.

In this case, the support surface may be inserted and supported in the insertion groove.

In this case, the support surface may include a first support surface disposed oppositely in the radial direction of the inlet pipe to be inserted and supported in the insertion groove, and a second support surface disposed oppositely in the axial direction of the inlet pipe to be closely supported on the inner peripheral surface of the branch hole.

In this case, the first support surface and the second support surface may be integrally formed to extend.

In this case, the first support surface and the second support surface may be spaced apart from each other.

In this case, the reinforcing bar may be formed with a pressing surface for pressing the circumference of the outer peripheral surface of the inlet pipe, and support walls that protrude in the radial direction of the inlet pipe may be formed on both sides of the pressing surface.

Advantageous Effects

Since the coupling assembly for branching a pipe according to the present invention having the above configuration can be constructed by fastening a coupler to the inlet pipe, it is possible to reduce assembly man-hours and construction costs. In addition, since an extension portion which is inserted into the inlet pipe is formed, it is possible to effectively prevent the leakage of branched fluid, even when the diameter of the branch hole formed in the inlet pipe is increased.

In particular, according to the Underwriters Laboratories (UL) standards, in order to use a branch pipe having the same inner diameter as the inlet pipe, the inner diameter at a part branching from the inlet pipe must be formed to be the same as the inlet pipe. As described above, since the inner diameter of the extension portion formed in the coupler is the same as or greater than the inner diameter of the inlet pipe, a branch pipe having the same inner diameter as the inlet pipe can be used.

The effects of the present invention are not limited to the above-described effects, and it should be understood to include all effects that can be inferred from the configuration of the invention described in the detailed description or claims of the present invention.

DESCRIPTION OF DRAWINGS

FIG. 5 is a view illustrating a state of cutting along the radial direction of the inlet pipe, and FIG. 6 is a view illustrating a state of cutting along the axial direction of the inlet pipe.

EMBODIMENTS

Figure 1:
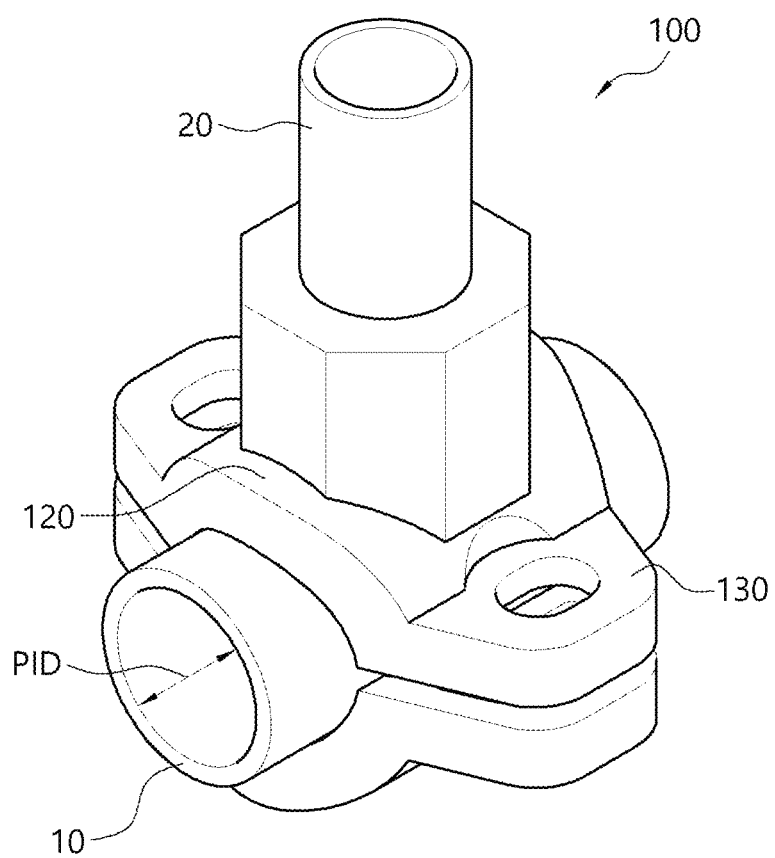
FIG. 1 is a perspective view of the coupling assembly according to an embodiment of the present invention.

Hereinafter, embodiments of the present invention will be described in detail with reference to the accompanying drawings such that those of ordinary skill in the art to which the present invention pertains may easily practice the present invention. The present invention may be implemented in various different forms, and is not limited to the embodiments described herein. In the drawings, parts irrelevant to the description are omitted in order to clearly describe the present invention, and the same reference numerals are assigned to the same or similar components throughout the specification.

In the present specification, terms such as "include", "have" or the like are intended to designate that a feature, a number, a step, an operation, a component, a part or a combination thereof described in the specification exists, and these should be understood such that it does not preclude the possibility of the presence or addition of one or more other features or numbers, steps, operations, components, parts or combinations thereof.

Figure 2:
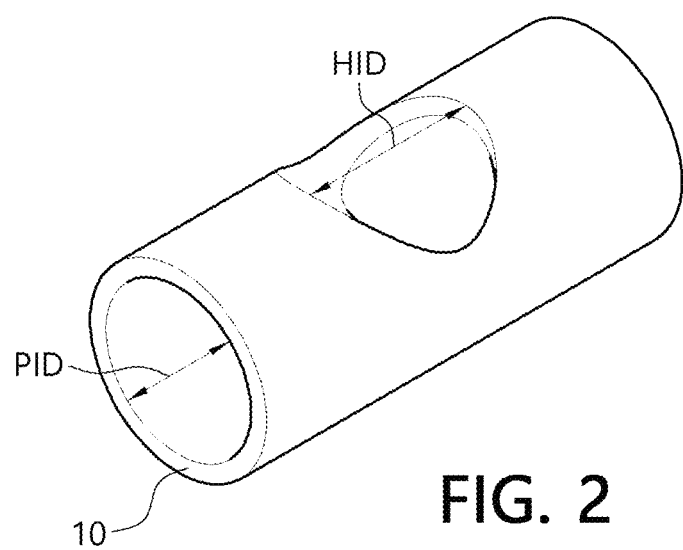
FIG. 2 is a perspective view illustrating an inlet pipe to which the coupling assembly according to an embodiment of the present invention is fastened.
Figure 3:
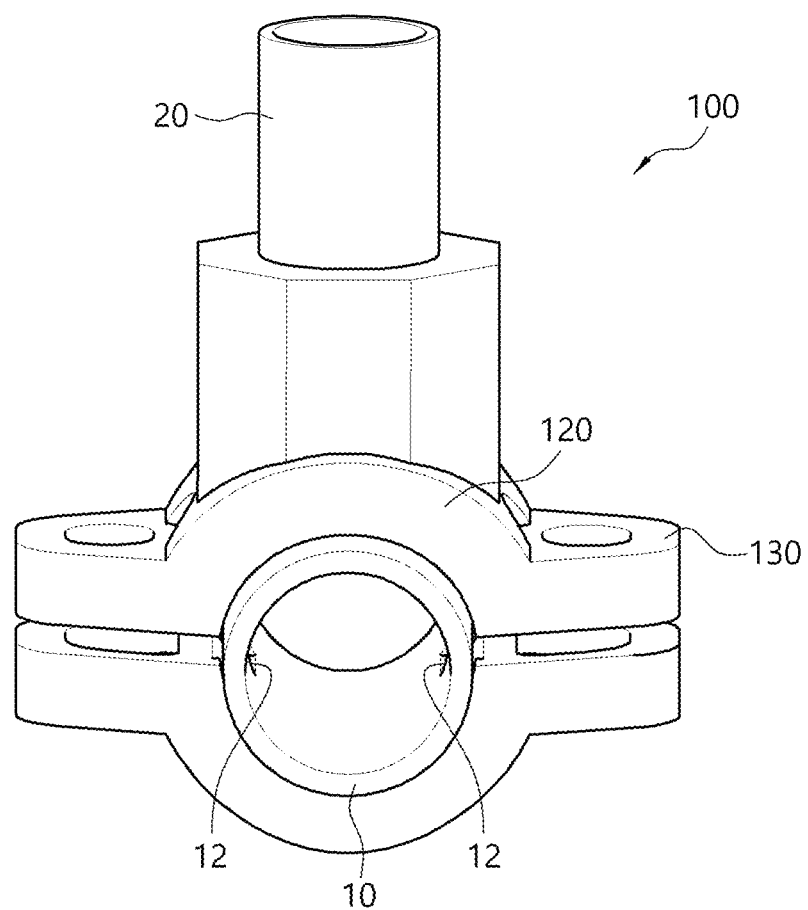
FIG. 3 is a front view of the coupling assembly according to an embodiment of the present invention.
Figure 4:
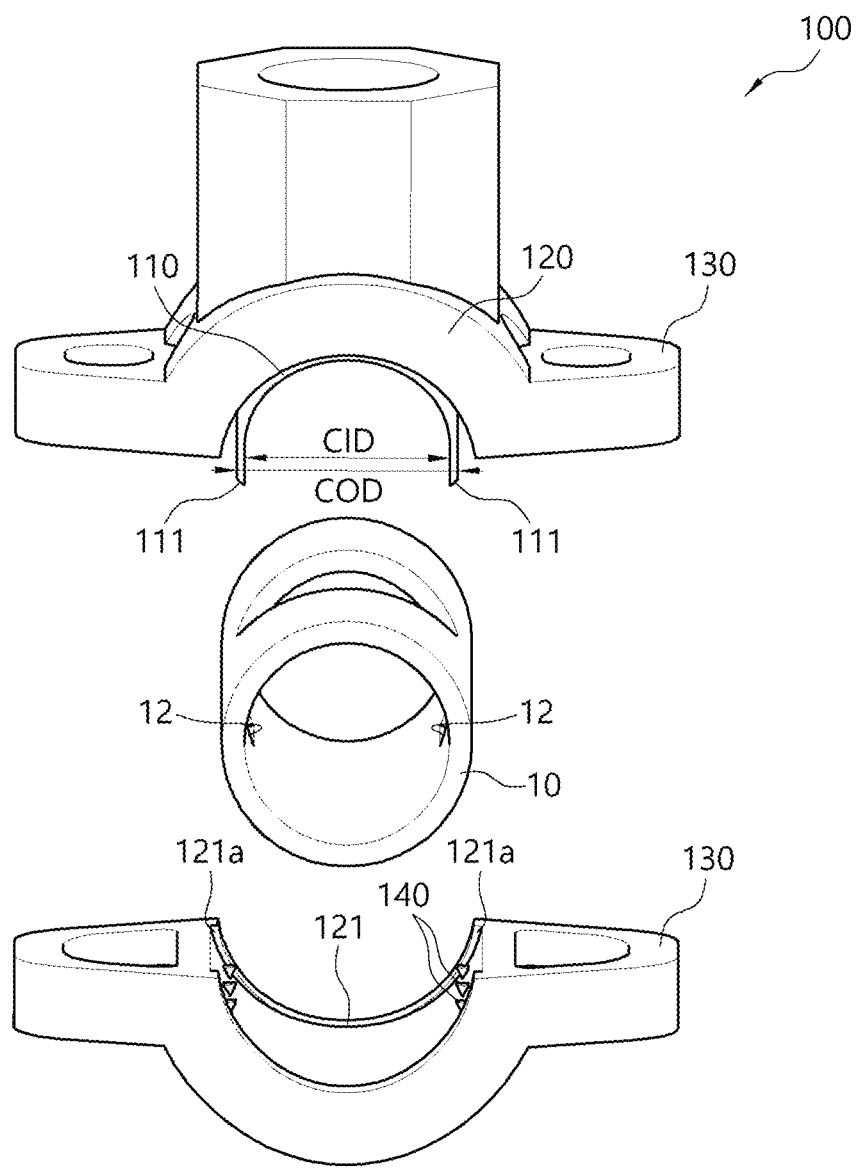
FIG. 4 is an exploded perspective view of the coupling assembly according to an embodiment of the present invention.
Figure 5:
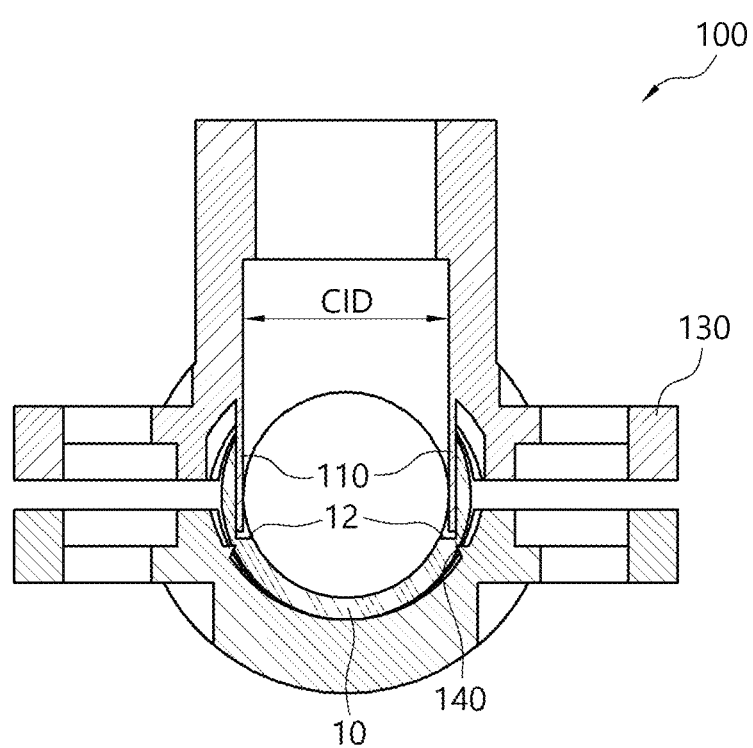
FIGS. 5 and 6 are cross-sectional views of the coupling assembly according to an embodiment of the present invention.
Figure 6:
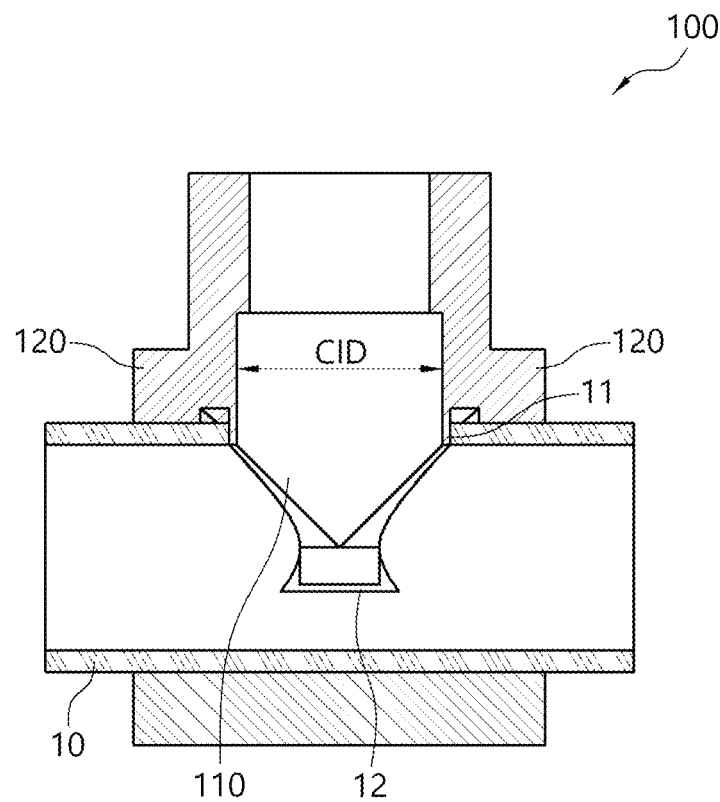
Figure 7:
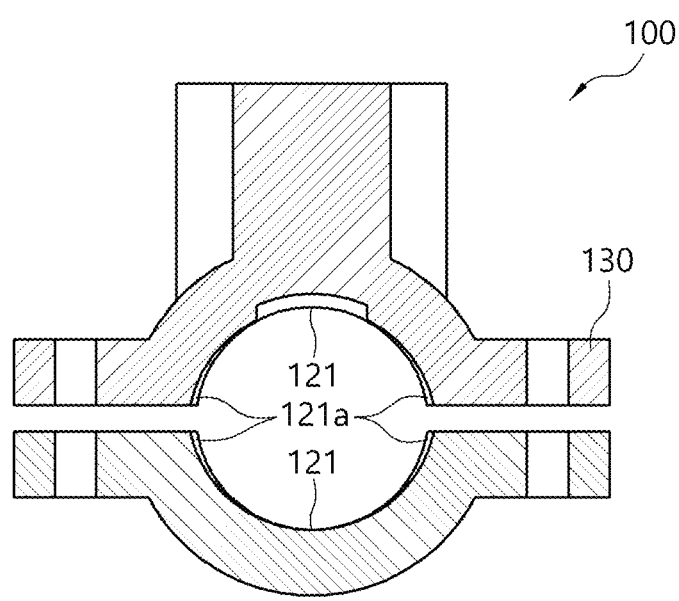
FIG. 7 is a cross-sectional view of a reinforcing bar of the coupling assembly according to an embodiment of the present invention.

FIG. 1 is a perspective view of the coupling assembly according to an embodiment of the present invention, FIG. 2 is a perspective view illustrating an inlet pipe to which the coupling assembly according to an embodiment of the present invention is fastened, FIG. 3 is a front view of the coupling assembly according to an embodiment of the present invention, FIG. 4 is an exploded perspective view of the coupling assembly according to an embodiment of the present invention, FIGS. 5 and 6 are cross-sectional views of the coupling assembly according to an embodiment of the present invention, FIG. 5 is a view illustrating a state of cutting along the radial direction of the inlet pipe, and FIG. 6 is a view illustrating a state of cutting along the axial direction of the inlet pipe, and FIG. 7 is a cross-sectional view of a reinforcing bar of the coupling assembly according to an embodiment of the present invention.

Hereinafter, the present invention will be described with reference to the configurations illustrated in FIGS. 1 to 7.

As illustrated in FIG. 1, the coupling assembly according to the present invention is a coupling assembly, including an inlet pipe 10 having a branch hole 11 for branching an inflowing fluid, a branch pipe 20 in communication with the inlet pipe 10 to allow a fluid branched through the branch hole 11 to flow therethrough, and a coupler 100 which interconnects the inlet pipe 10 and the branch pipe 20, wherein the coupler 100 has an extension portion 110 which passes through the branch hole 11 and is inserted into the inlet pipe 10, and the inner diameter (CID) of the extension portion 110 is the same as the inner diameter (PID) of the inlet pipe 10.

That is, since construction is possible by simply fastening the coupler 100 to the inlet pipe 10, the number of assembly man-hours and construction costs are reduced.

In addition, in order to use the branch pipe 20 having the same inner diameter as the inlet pipe 10 according to the Underwriters Laboratories (UL) standards, the inner diameter at the part branching from the inlet pipe 10 must be formed to be the same as the inner diameter of the inlet pipe 10, and as described above, since the inner diameter (CID) of the extension portion 110 formed in the coupler 100 is formed to be the same as the inner diameter (PID) of the inlet pipe 10, it becomes possible to use a branch pipe 20 having the same inner diameter as the inlet pipe 10.

The coupler 100 is provided with a first part disposed above the inlet pipe 10 with the inlet pipe 10 as a center and connected to the branch pipe 20, and a second part disposed below the inlet pipe 10 and fastened to the first part.

A flange 130 through which a fixing member passes is formed such that the first part and the second part are fixed to each other while the first part and the second part are disposed above and below the inlet pipe 10, respectively. The fixing member may be a fixing member such as a bolt or a nut, but any configuration may be used as long as the first part and the second part can be mutually fixed.

Moreover, a support protrusion 140 for pressing the outer peripheral surface of the inlet pipe 10 may be formed in the second part, and the support protrusion 140 supports the coupler 100 not to rotate along the circumferential direction of the inlet pipe 10 even when an external force is applied after the coupler 100 is mounted. The support protrusion 140 may be composed of a plurality of support protrusions 140 separated from each other along the circumferential direction of the inlet pipe 10 or along the axial direction of the inlet pipe 10.

A gasket of an elastic material may be provided between the inlet pipe 10 and the coupler 100, and the gasket is pressed by the fastening force through the fixing member when the coupler 100 is mounted to effectively prevent fluid leakage.

In this case, the support surface 111 which is supported by the inner peripheral surface of the inlet pipe 10 may be formed on the outer peripheral surface of the extension portion 110. That is, when the coupler 100 is mounted, the extension portion 110 penetrates the branch hole 11 and is disposed inside the inlet pipe 10, and when the support surface 111 is formed on the outer peripheral surface of the extension portion 110, the inner peripheral surface of the inlet pipe 10 and the outer peripheral surface of the extension portion 110 are closely supported to each other.

That is, in the part where the coupler 100 is mounted, the fluid flow flowing along the axial direction of the inlet pipe 10 and the fluid flow flowing along the radial direction of the inlet pipe 10 to branch into the branch pipe 20 are formed, and as described above, when the support surface 111 is formed on the outer peripheral surface of the extension portion 110, the inner peripheral surface of the inlet pipe 10 and the outer peripheral surface of the extension portion 110 are closely supported to each other and do not interfere with the fluid flow such that the fluid may flow smoothly.

In this case, the outer diameter (COD) of the extension portion 110 is formed to be greater than the inner diameter (PID) of the inlet pipe (10). As described above, the inner diameter (CID) of the extension portion 110 is formed to be the same as the inner diameter (PID) of the inlet pipe 10, and since this extension portion 110 has a predetermined thickness to effectively support the same even when an external force is applied to the coupler 100, the outer diameter (COD) of the extension portion 110 is formed to be greater than the inner diameter (PID) of the inlet pipe 10.

In addition, the inner diameter (HID) of the branch hole 11 may be formed to be the same as the outer diameter (COD) of the extension portion 110. When configured in this way, when the extension portion 110 is inserted into the branch hole 11, the outer peripheral surface of the extension portion 110 and the inner peripheral surface of the branch hole 11 are closely supported to each other, and fluid leakage between them may be effectively prevented. In addition, since the operator can simply install this extension portion 110 in the correct position by inserting the same into the branch hole 11, easy and quick installation is possible.

In this way, the operator uses a tool having the same size as the outer diameter (COD) of the extension portion 110 such that the inner diameter (HID) of the branch hole 11 is formed to be the same as the outer diameter (COD) of the extension portion 110 to form the branch hole 11 in such a way that the outer peripheral surface of the inlet pipe 10 is perforated.

In this case, an insertion groove 12 having the same inner diameter as the inner diameter of the branch hole 11 may be formed on the inner peripheral surface of the inlet pipe 10 along the insertion direction of the extension portion 110. The operator perforates the outer peripheral surface of the inlet pipe 10 by using a tool having the same size as the outer diameter (COD) of the extension portion 110 to form the branch hole 11, and even if the branch hole 11 is formed on the upper surface of the inlet pipe 10, the perforation is continued, and finally, the perforation proceeds until an insertion groove 12, into which the extension portion 110 is inserted, is formed at the inner peripheral surface portion disposed on the side of the inlet pipe 10.

That is, as illustrated in FIG. 5, the inner diameter (PID) of the inlet pipe 10 and the inner diameter (CID) of the extension portion 110 are formed to be the same size, and thus, since the instantaneous flow rate in the extension portion 110, which is a part where the fluid flowing inside the inlet pipe 10 branches into the branch pipe 20, is formed to be the same as the instantaneous flow rate of the fluid flowing through the inlet pipe 10, the inlet pipe, it is possible to satisfy the conditions required by the UL standards in order to use the branch pipe 20 having the same inner diameter as the inlet pipe 10.

In addition, since the extension portion 110 having an inner diameter greater than the inner diameter (PID) of the inlet pipe 10 is inserted, in order to effectively prevent fluid leakage and secure a stable support structure, the extension portion 110 is configured to pass through the upper surface of the inlet pipe 10 and be seated in the insertion groove 12 formed on the side of the inlet pipe 10. That is, the support surface 111 formed on the extension portion 110 is inserted and supported in the insertion groove 12.

In this case, the cross-sectional shape of the extension portion 110 is formed in a shape where a part is removed from the shape having a circular circumference such as the inlet pipe 10. That is, the extension portion 110 is preferably formed in a shape that does not act as a resistance to the fluid flowing along the axial direction of the inlet pipe 10 while it is inserted into the inlet pipe 10, and as illustrated in FIG. 5, the remaining part is removed except for the part inserted into the insertion groove 12 of the inlet pipe 10.

When configured in this way, not only the fluid flow inside the inlet pipe 10 may be smoothed, but also the extension portion 110 is supported by the insertion groove 12 formed in the inlet pipe 10 such that the coupler 100 may be stably supported.

In this case, the coupler 100 may be formed with a reinforcing bar 120 for pressing the circumference of the outer peripheral surface of the inlet pipe 10. An extension rib extending along the axial direction of the inlet pipe 10 is formed in the gasket described above so as to increase an area in close contact with the outer peripheral surface of the inlet pipe 10, and the reinforcing bar 120 formed in the coupler 100 presses this extension rib to effectively prevent fluid leakage.

To this end, the reinforcing bar 120 is formed with a pressing surface 121 for pressing the circumference of the outer peripheral surface of the inlet pipe 10 and is configured to press the above-described extended rib. Moreover, support walls 121a protruding in the radial direction of the inlet pipe 10 may be formed on both sides of the pressing surface 121 formed on the reinforcing bar 120. That is, as illustrated in FIG. 7, such a support wall 121a is not formed on the upper portion of the pressing surface 121, and thus, when the coupler 100 is mounted, since the gasket can be pressed until the upper portion of the pressing surface 121 contacts the outer peripheral surface of the inlet pipe 10, even if the size of the branch hole 11 is formed to be greater than the inner diameter (PID) of the inlet pipe 10, it is possible to effectively prevent fluid leakage.

Support walls 121a protruding in the radial direction of the inlet pipe 10 may be formed on both sides of the pressing surface 121. That is, when the coupler 100 is mounted, the part where the support wall 121a is formed presses the gasket only until the support wall 121a comes into contact with the outer peripheral surface of the inlet pipe 10. In this case, the support wall 121a supports the extension rib of the gasket even when pressure is applied due to the fluid flow to prevent the gasket from separating to the outside, as well as preventing the extension rib from being exposed to the outside to effectively prevent deterioration of the durability of the gasket.

That is, since the support wall 121a is not formed on the upper portion of the pressing surface 121, the gasket is sufficiently pressed to effectively prevent fluid leakage around the branch hole 11, and the support walls 121a are formed on both sides of the pressing surface 121 such that the degree of pressing of the gasket may be partially reduced, but since it is a part spaced apart from the branch hole 11 by a certain distance, it is possible to effectively prevent fluid leakage even when the degree of pressing is reduced in this way, as well as to prevent separation of the gasket and outside exposure of the gasket.

Figure 8:
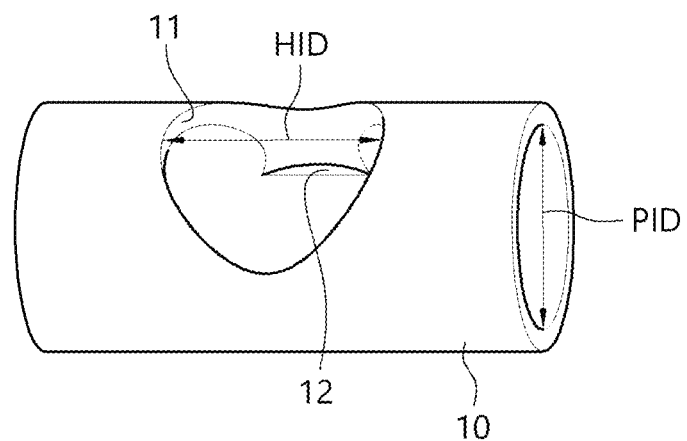
FIG. 8 is a perspective view illustrating an inlet pipe to which the coupling assembly according to another embodiment of the present invention is fastened.
Figure 9:
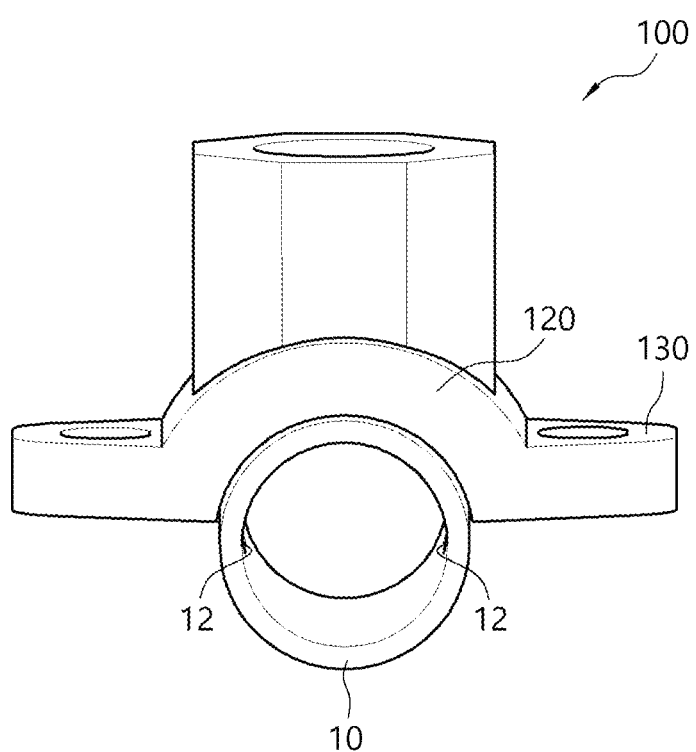
FIG. 9 is a front view of the coupling assembly according to another embodiment of the present invention.
Figure 10:
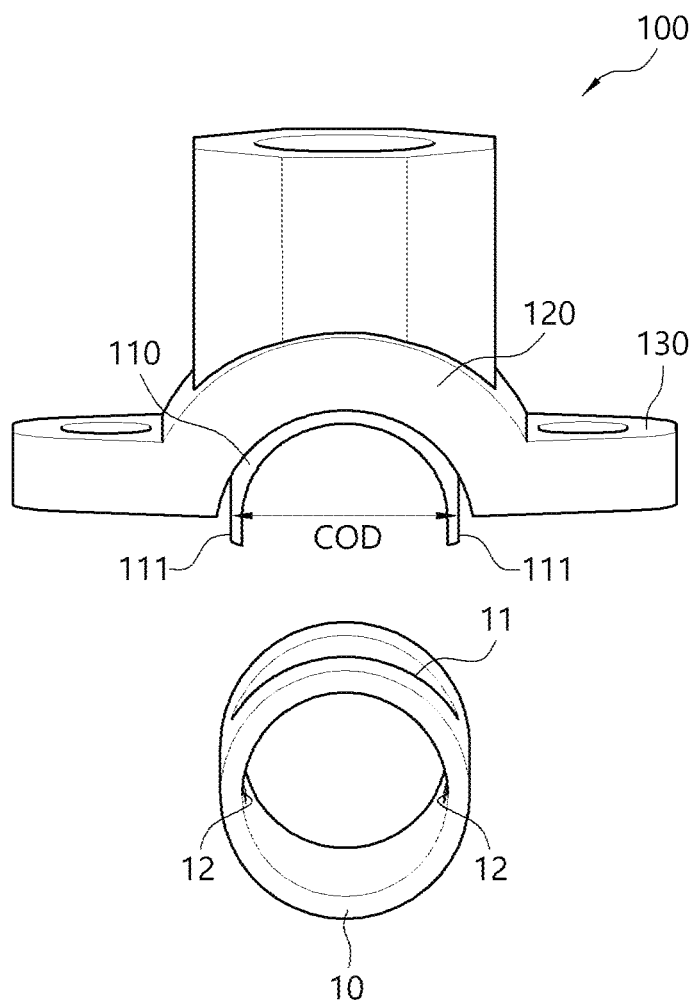
FIG. 10 is an exploded perspective view of the coupling assembly according to another embodiment of the present invention.
Figure 11:
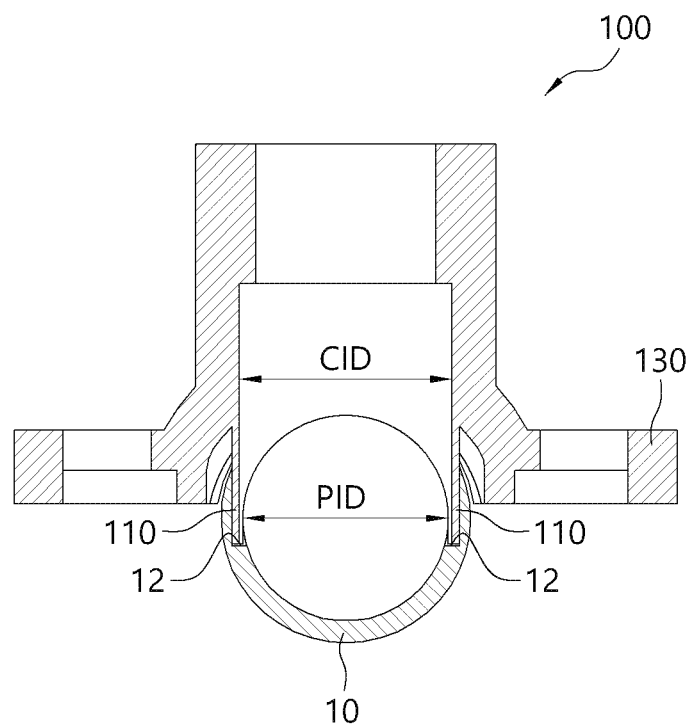
FIG. 11 is a cross-sectional view illustrating a state in which the coupling assembly according to another embodiment of the present invention is cut along the radial direction of an inlet pipe.
Figure 12:
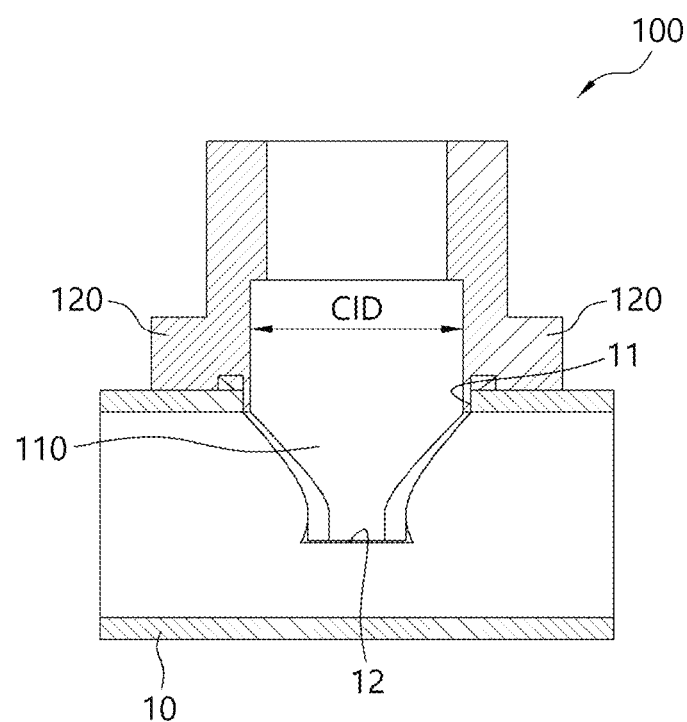
FIG. 12 is a cross-sectional view illustrating a state in which the coupling assembly according to another embodiment of the present invention is cut along the axial direction of the inlet pipe.

FIG. 8 is a perspective view illustrating an inlet pipe to which the coupling assembly according to another embodiment of the present invention is fastened, FIG. 9 is a front view of the coupling assembly according to another embodiment of the present invention, FIG. 10 is an exploded perspective view of the coupling assembly according to another embodiment of the present invention, FIG. 11 is a cross-sectional view illustrating a state in which the coupling assembly according to another embodiment of the present invention is cut along the radial direction of an inlet pipe, and FIG. 12 is a cross-sectional view illustrating a state in which the coupling assembly according to another embodiment of the present invention is cut along the axial direction of the inlet pipe.

As illustrated in FIG. 1, the coupling assembly according to the present invention includes an inlet pipe 10 through which a fluid flows, a branch pipe 20 in communication with the inlet pipe 10 to allow a branched fluid to flow therethrough, and a coupler 100 which interconnects the inlet pipe 10 and the branch pipe 20. As illustrated in FIG. 8, a branch hole 11 for branching the inflow fluid is formed in the inlet pipe 10.

That is, the fluid introduced into the inlet pipe 10 flows to the branch pipe 20 via the coupler 100 through the branch hole 11.

As illustrated in FIGS. 9 and 10, the coupler 100 is formed with an extension portion 110 that penetrates the branch hole 11 and is inserted into the inlet pipe 10.

In this case, the inner diameter (CID) of the extension portion 110 is the same as the inner diameter (PID) of the inlet pipe 10 or, as illustrated in FIG. 11, it may be formed to be greater than the inner diameter (PID) of the inlet pipe 10.

That is, since construction is possible by simply fastening the coupler 100 to the inlet pipe 10, assembly man-hours and construction costs are reduced.

Further, in order to use the branch pipe 20 having the same inner diameter as the inlet pipe 10 according to the Underwriters Laboratories (UL) standards, the inner diameter at the part branching from the inlet pipe 10 must be formed to be the same as the inner diameter of the inlet pipe 10, and as described above, since the inner diameter (CID) of the extension portion 110 formed in the coupler 100 is formed to be the same as the inner diameter (PID) of the inlet pipe 10, it becomes possible to use a branch pipe 20 having the same inner diameter as the inner diameter of the inlet pipe 10.

Moreover, as illustrated in FIG. 11, it is also possible to form the inner diameter (CID) of the extension portion 110 to be greater than the inner diameter (PID) of the inlet pipe 10, and if configured in this way, not only can the UL standards be satisfied, but also the branched fluid can flow more smoothly such that a sufficient flow rate may be secured inside the branch pipe 20.

A flange 130 through which the fixing member passes is formed such that the first part and the second part are fixed to each other while the first part and the second part are disposed above or below of the inlet pipe 10. The fixing member may be a fixing member such as a bolt or a nut, but any configuration may be used as long as the first part and the second part can be mutually fixed. Alternatively, the first part may be disposed on the upper part of the inlet pipe 10 as shown in FIG. 9, and the first part may be fixed to the lower part of the inlet pipe 10 using a fixing member such as a U bolt.

In addition, a support protrusion for pressing the outer peripheral surface of the inlet pipe 10 may be formed in the second part, and the support protrusion 140 supports the coupler 100 not to rotate along the circumferential direction of the inlet pipe 10 even when an external force is applied after the coupler 100 is mounted. The support protrusion 140 may be composed of a plurality of support protrusions 140 separated from each other along the circumferential direction of the inlet pipe 10 or along the axial direction of the inlet pipe 10.

A gasket of an elastic material may be provided between the inlet pipe 10 and the coupler 100, and the gasket is pressed by the fastening force through the fixing member when the coupler 100 is mounted to effectively prevent fluid leakage.

In this case, as illustrated in FIG. 10, the support surface 111 which is supported by the inner peripheral surface of the branch hole 11 may be formed on the outer peripheral surface of the extension portion 110. That is, in the part where the coupler 100 is mounted, the fluid flow flowing along the axial direction of the inlet pipe 10 and the fluid flow flowing along the radial direction of the inlet pipe 10 to branch into the branch pipe 20 are formed, and as described above, when the support surface 111 is formed on the outer circumferential surface of the extension portion 110, the support surface 111 and the inner circumferential surface of the branch hole 11 are closely supported to each other to effectively prevent leakage of the branched fluid.

In this case, the outer diameter (COD) of the extension portion 110 is formed to be greater than the inner diameter (PID) of the inlet pipe 10. As described above, the inner diameter (CID) of the extension portion 110 is formed to be the same as the inner diameter (PID) of the inlet pipe 10 or is formed to be greater than the inner diameter (PID) of the inlet pipe 10, and since the extension portion 110 has a predetermined thickness to effectively support the coupler 110 even when an external force is applied thereto, the outer diameter (COD) of the extension portion 110 is formed to be greater than the inner diameter (PID) of the inlet pipe 10.

In addition, the inner diameter (HID) of the branch hole 11 may be formed to be the same as the outer diameter (COD) of the extension portion 110. When configured in this way, when the extension portion 110 is inserted into the branch hole 11, the outer peripheral surface of the extension portion 110 and the inner peripheral surface of the branch hole 11 are closely supported to each other, and it is possible to effective prevent fluid leakage therebetween. In addition, since the operator can simply install the extension portion 110 in the correct position by inserting the same into the branch holes 11, easy and quick installation is possible.

In this way, the operator uses a tool having the same size as the outer diameter (COD) of the extension portion 110 such that the inner diameter (HID) of the branch hole 11 is formed to be the same as the outer diameter (COD) of the extension portion 110 to form the branch hole 11 in such a way that the outer peripheral surface of the inlet pipe 10 is perforated.

In this case, an insertion groove 12 having the same inner diameter as the inner diameter of the branch hole 11 may be formed on the inner peripheral surface of the inlet pipe 10 along the insertion direction of the extension portion 110. The operator perforates the outer peripheral surface of the inlet pipe 10 by using a tool having the same size as the outer diameter (COD) of the extension portion 110 to form the branch hole 11, and even if the branch hole 11 is formed on the upper surface of the inlet pipe 10, the perforation is continued, and finally, the perforation proceeds until an insertion groove 12, into which the extension portion 110 is inserted, is formed at the inner peripheral surface portion disposed on the side surface in the radial direction of the inlet pipe 10. In this case, the perforation is performed while the central axis of the tool for perforating intersects the central axis of the inlet pipe 10, and the inlet pipe 10 is perforated while both ends of the inlet pipe 10 are firmly fastened such that this arrangement may be stably maintained during the perforation process.

That is, the inner diameter (CID) of the extension portion 110 is the same as the inner diameter (PID) of the inlet pipe 10 or, as illustrated in FIG. 11, it is formed to be greater than the inner diameter (PID) of the inlet pipe 10, and thus, the instantaneous flow rate in the extension portion 110, which is a part where the fluid flowing inside the inlet pipe 10 is branched into the branch pipe 20, is the same as the instantaneous flow rate of the fluid flowing through the inlet pipe 10, or in some cases, it is formed to be greater, and thus, it is possible to satisfy the conditions required by the UL standards in order to use the branch pipe 20 having the same inner diameter as the inlet pipe 10.

In addition, since the extension portion 110 is inserted and supported in the insertion groove 12 while penetrating the branch hole 11 formed in the inlet pipe 10, it is possible to effectively prevent fluid leakage and secure a stable support structure.

In this case, the cross-sectional shape of the extension portion 110 is formed in a shape in which a part is removed from the shape having a circular circumference such as the inlet pipe 10. That is, the extension portion 110 is preferably formed in a shape that does not act as a resistance to the fluid flowing along the axial direction of the inlet pipe 10 while being inserted into the inlet pipe 10, and as illustrated in FIG. 11, the remaining part is removed except for the part inserted into the insertion groove 12 of the inlet pipe 10.

When configured in this way, not only the fluid flow inside the inlet pipe 10 can be smoothed, but also the extension portion 110 is supported by the insertion groove 12 formed in the inlet pipe 10 such that the coupler 100 can be stably supported.

In this case, the support surface 111 may include a first support surface disposed oppositely in the radial direction of the inlet pipe 10 to be inserted and supported in the insertion groove 12, and a second support surface disposed oppositely in the axial direction of the inlet pipe 10 to be closely supported on the inner peripheral surface of the branch hole 11.

That is, after the inlet pipe 10 and the branch pipe 20 are mutually fixed through the coupler 100, external forces are applied to the branch pipe 20 in various directions. In particular, in the UL certification process, an external force is applied to the branch pipe 20, but an external force is applied to the branch pipe 20 in the same direction as the axial direction of the inlet pipe 10, or an external force is applied to the branch pipe 20 in the tangent direction in contact with the outer peripheral surface of the inlet pipe 10, and as described above, when the first support surface that is disposed oppositely in the radial direction of the inlet pipe 10 to be inserted and supported in the insertion groove 12 is formed, stable support is possible even when an external force is applied to the branch pipe 20 in the tangential direction in contact with the outer peripheral surface of the inlet pipe 20. In addition, when the second support surface that is disposed oppositely in the axial direction of the inlet pipe 10 to be closely supported in the inner peripheral surface of the branch hole 11 is formed, stable support is possible even when an external force is applied to the branch pipe 20 in the same direction as the axial direction of the inlet pipe 10.

The first support surface and the second support surface may be integrally formed to extend, and when configured in this way, the first support surface and the second support surface are continuously connected to the inner peripheral surface of the branch hole 11 and the insertion groove 12, and thus, it is possible to effectively prevent fluid leakage during branching.

In this case, as illustrated in FIG. 12, the coupler 100 may be formed with a reinforcing bar 120 for pressing the circumference of the outer peripheral surface of the inlet pipe 10. An extension rib extending along the axial direction of the inlet pipe 10 is formed in the gasket described above so as to increase an area in close contact with the outer peripheral surface of the inlet pipe 10, and the reinforcing bar 120 formed in the coupler 100 presses this extension rib to effectively prevent fluid leakage. The detailed structure of this reinforcing bar 120 will be described below.

Figure 13:
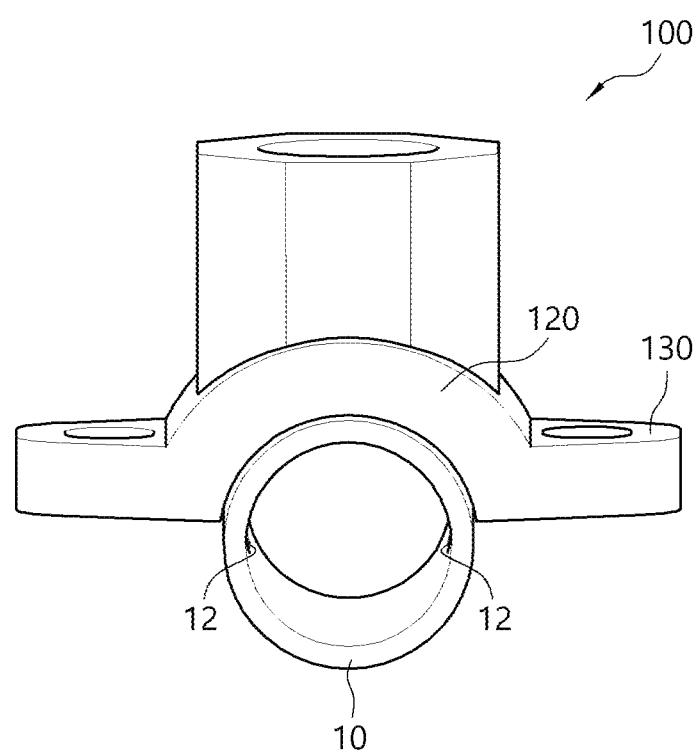
FIG. 13 is a front view of the coupling assembly according to still another embodiment of the present invention.
Figure 14:
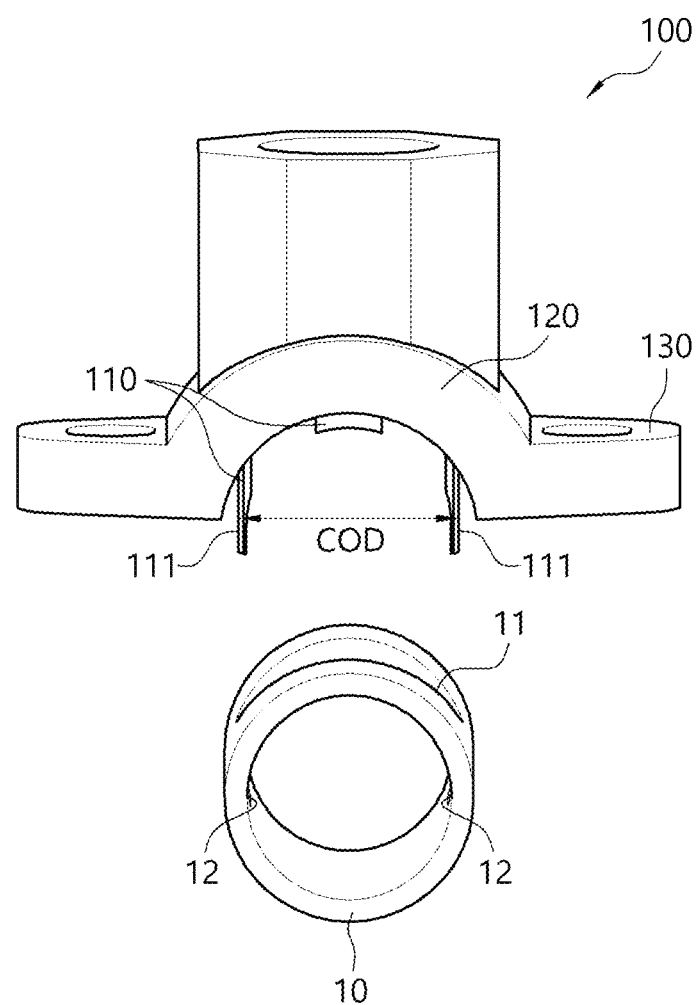
FIG. 14 is an exploded perspective view of the coupling assembly according to still another embodiment of the present invention.
Figure 15:
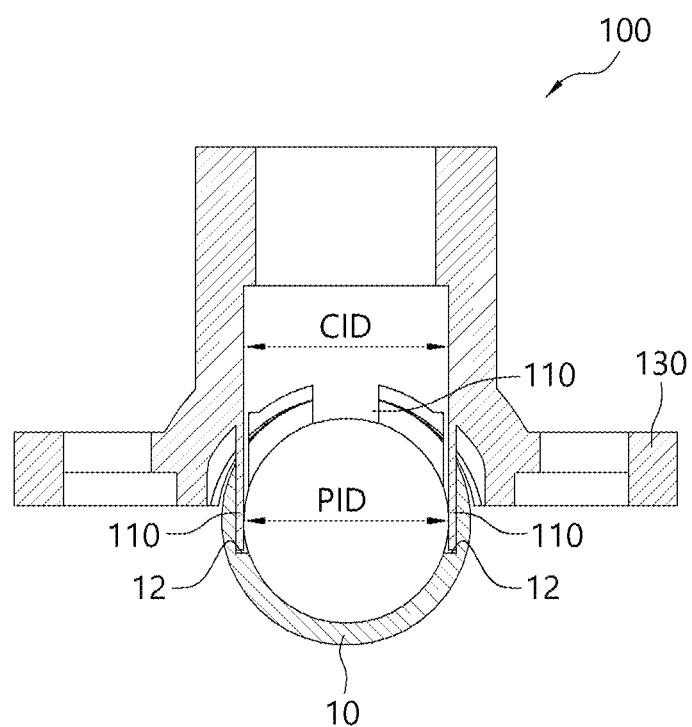
FIGS. 15 and 16 are cross-sectional views illustrating a state in which the coupling assembly according to still another embodiment of the present invention is cut along the radial direction of an inlet pipe.
Figure 16:
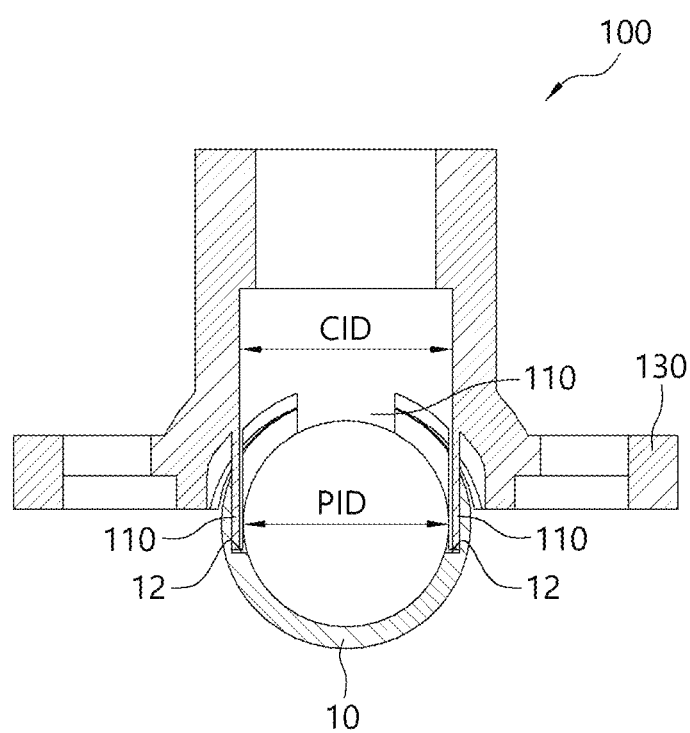
Figure 17:
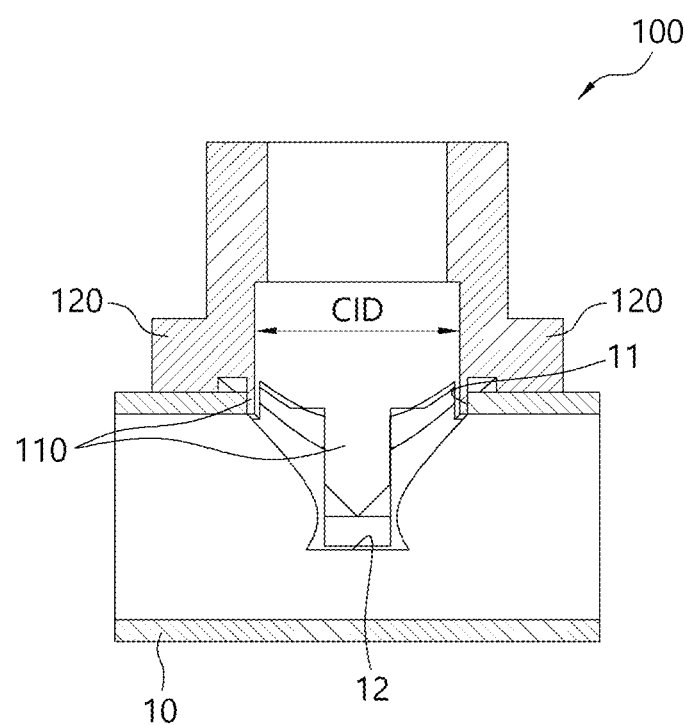
FIG. 17 is a cross-sectional view illustrating a state in which the coupling assembly according to still another embodiment of the present invention is cut along the axial direction of an inlet pipe.

FIG. 13 is a front view of the coupling assembly according to still another embodiment of the present invention, FIG. 14 is an exploded perspective view of the coupling assembly according to still another embodiment of the present invention, FIGS. 15 and 16 are cross-sectional views illustrating a state in which the coupling assembly according to still another embodiment of the present invention is cut along the radial direction of an inlet pipe, and FIG. 17 is a cross-sectional view illustrating a state in which the coupling assembly according to still another embodiment of the present invention is cut along the axial direction of an inlet pipe.

As illustrated in FIGS. 13 and 14, the coupler 100 is formed with an extension portion 110 that penetrates the branch hole 11 and is inserted into the inlet pipe 10.

In this case, as illustrated in FIG. 15, the inner diameter (CID) of the extension portion 110 is the same as the inner diameter (PID) of the inlet pipe 10, or as illustrated in FIG. 16, it may be formed to be greater than the inner diameter (PID) of the inlet pipe 10.

That is, as described above, since construction is possible by simply fastening the coupler 100 to the inlet pipe 10, assembly man-hours and construction costs are reduced. Further, in accordance with the UL (Underwriters Laboratories) standards, in order to use the branch pipe 20 having the same inner diameter as the inlet pipe 10, the inner diameter at the part branching from the inlet pipe 10 must be formed to be the same as the inner diameter of the inlet pipe 10, and since the inner diameter (CID) of the extension portion 110 formed in the coupler 100 is the same as the inner diameter (PID) of the inlet pipe 10 or is formed to be greater than the inner diameter (PID) of the inlet pipe 10, even if the branch pipe 20 having the same inner diameter as the inlet pipe 10 is used, not only can the UL standards be satisfied, but also the branched fluid may flow more smoothly such that it is possible to secure a sufficient flow inside the branch pipe 20.

In this case, the configuration in which the outer diameter (COD) of the extension portion 110 is formed to be greater than the inner diameter (PID) of the inlet pipe 10, and the inner diameter (HID) of the branch hole 11 is formed to be the same as the outer diameter (COD) of the extension portion 110 has the same configuration as the above-described embodiment.

In addition, as described above, on the inner peripheral surface of the inlet pipe 10, an insertion groove 12 having the same inner diameter as the inner diameter of the branch hole 11 is formed along the insertion direction of the extension portion 110, and since the extension portion 110 is inserted and supported in the insertion groove 12 while penetrating the branch hole 11 formed in the inlet pipe 10, it is possible to effectively prevent fluid leakage and secure a stable support structure.

In this case, the support surface 111 includes a first support surface disposed oppositely in the radial direction of the inlet pipe 10 to be inserted and supported in the insertion groove 12, and a second support surface disposed oppositely in the axial direction of the inlet pipe 10 to be closely supported on the inner peripheral surface of the branch hole 11, and the first support surface and the second support surface may be spaced apart from each other, and if configured in this way, even when external forces are applied to the branch pipe 20 in various directions, not only is it possible to achieve a stable support, but also the weight of the extension portion 110 is reduced such that it is possible to reduce the overall weight.

Moreover, as illustrated in FIG. 17, the configuration in which the coupler 100 is formed with a reinforcing bar 120 for pressing the circumference of the outer peripheral surface of the inlet pipe 10 has the same configuration as the above-described embodiment.

Figure 18:
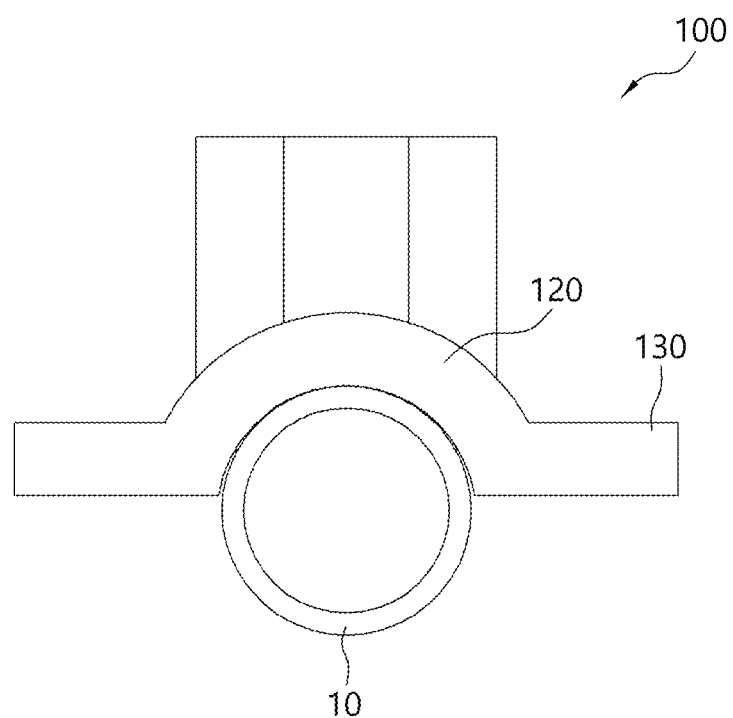
FIG. 18 is a front view of the coupling assembly according to still another embodiment of the present invention.
Figure 19:
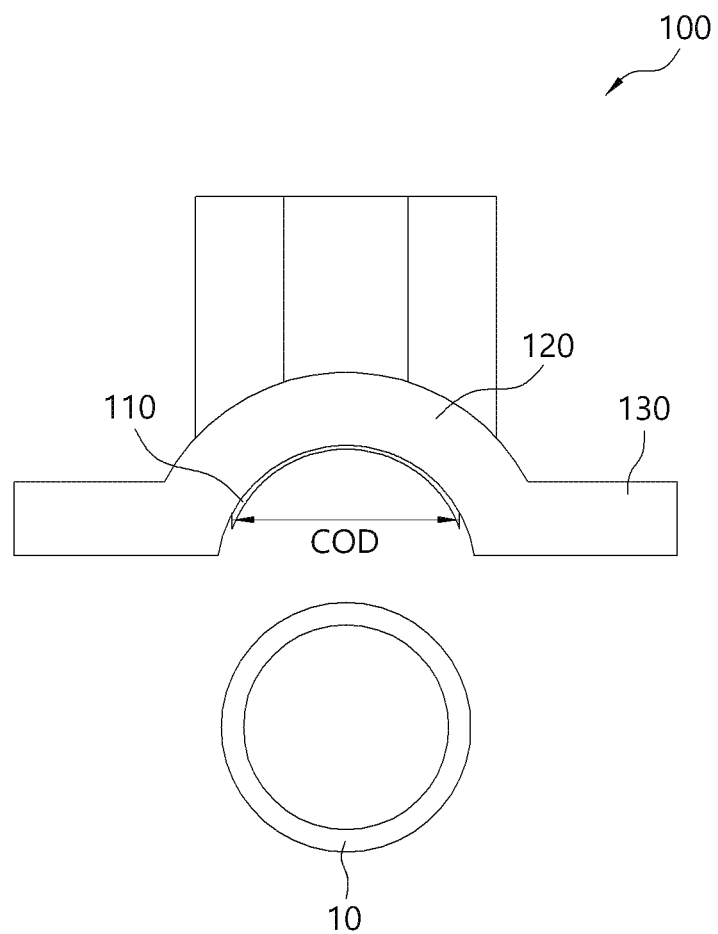
FIG. 19 is an exploded perspective view of the coupling assembly according to still another embodiment of the present invention.
Figure 20:
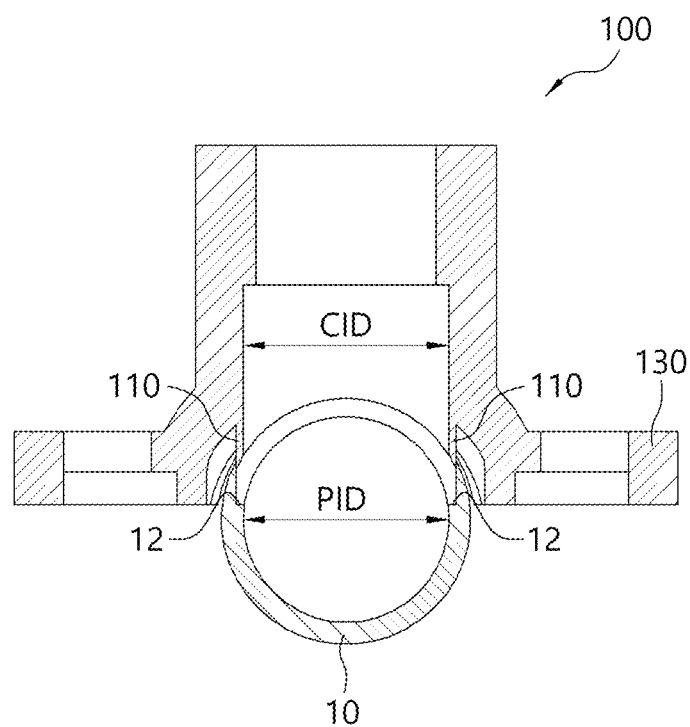
FIGS. 20 and 21 are cross-sectional views illustrating a state in which the coupling assembly according to still another embodiment of the present invention is cut along the radial direction of an inlet pipe.
Figure 21:
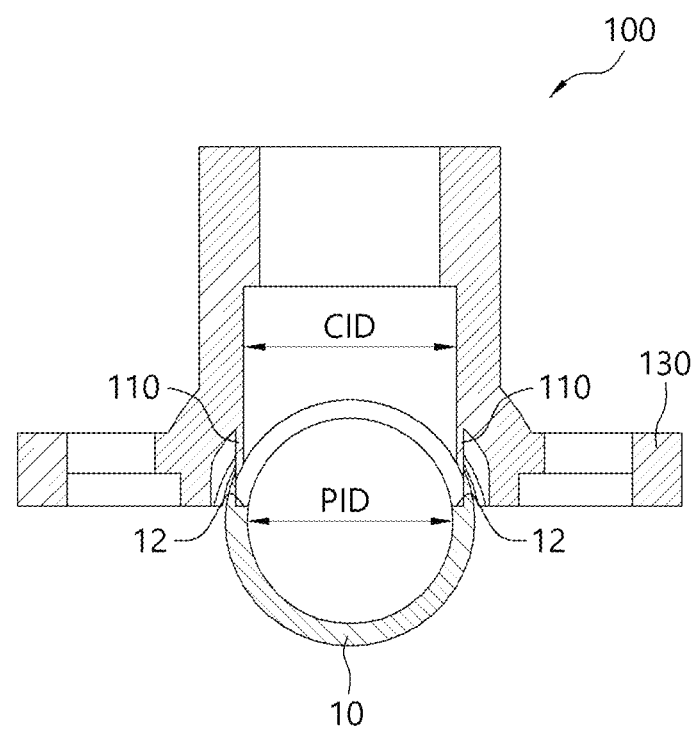
Figure 22:
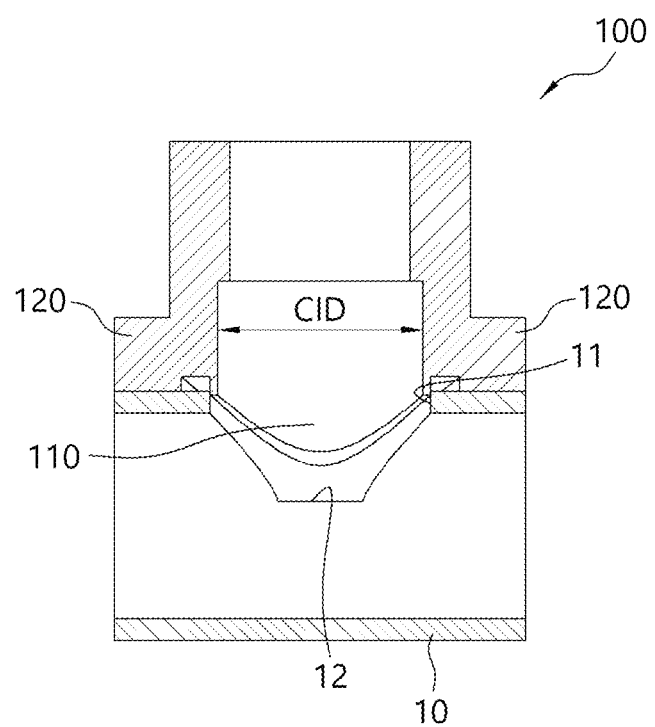
FIG. 22 is a cross-sectional view illustrating a state in which the coupling assembly according to still another embodiment of the present invention is cut along the axial direction of an inlet pipe.

FIG. 18 is a front view of the coupling assembly according to still another embodiment of the present invention, FIG. 19 is an exploded perspective view of the coupling assembly according to still another embodiment of the present invention, FIGS. 20 and 21 are cross-sectional views illustrating a state in which the coupling assembly according to still another embodiment of the present invention is cut along the radial direction of an inlet pipe, and FIG. 22 is a cross-sectional view illustrating a state in which the coupling assembly according to still another embodiment of the present invention is cut along the axial direction of an inlet pipe.

As illustrated in FIGS. 18 and 19, the coupler 100 is formed with an extension portion 110 that penetrates the branch hole 11 and is inserted into the inlet pipe 10.

In this case, as illustrated in FIG. 20, the inner diameter (CID) of the extension portion 110 is the same as the inner diameter (PID) of the inlet pipe 10, or as illustrated in FIG. 21, it may be formed to be greater than the inner diameter (PID) of the inlet pipe 10.

That is, as described above, since construction is possible by simply fastening the coupler 100 to the inlet pipe 10, assembly man-hours and construction costs are reduced, and further, in accordance with the UL (Underwriters Laboratories) standards, in order to use the branch pipe 20 having the same inner diameter as the inlet pipe 10, the inner diameter at the part branching from the inlet pipe 10 must be formed to be the same as the inner diameter of the inlet pipe 10, and since the inner diameter (CID) of the extension portion 110 is the same as the inner diameter (PID) of the inlet pipe 10 or is formed to be greater than the inner diameter (PID) of the inlet pipe 10, not only can the UL standards be satisfied even when the branch pipe 20 having the same inner diameter as the inner diameter of the inlet pipe 10 is used, but also the branched fluid can flow more smoothly such that a sufficient flow rate may be secured inside the branch pipe 20.

In this case, the configuration in which the outer diameter (COD) of the extension portion 110 is formed to be greater than the inner diameter (PID) of the inlet pipe 10, and the inner diameter (HID) of the branch hole 11 is the same as the outer diameter (COD) of the extension portion 110 has the same configuration as the above-described embodiment.

In addition, as described above, on the inner peripheral surface of the inlet pipe 10, an insertion groove 12 having the same inner diameter as the inner diameter of the branch hole 11 is formed along the insertion direction of the extension portion 110, and since the extension portion 110 is inserted and supported in the insertion groove 12 while penetrating the branch hole 11 formed in the inlet pipe 10, it is possible to effectively prevent fluid leakage and secure a stable support structure.

In this case, the support surface 111 includes a first support surface disposed oppositely in the radial direction of the inlet pipe 10 to be inserted and supported in the insertion groove 12, and a second support surface disposed oppositely in the axial direction of the inlet pipe 10 to be closely supported on the inner peripheral surface of the branch hole 11, and the first support surface and the second support surface may be integrally formed to extend, and when configured in this way, the first support surface and the second support surface are continuously in close contact with the inner peripheral surface of the branch hole 11 and the insertion groove 12, it is possible to effectively prevent fluid leakage during branching.

Moreover, as illustrated in FIG. 22, the configuration in which the coupler 100 is formed with a reinforcing bar 120 for pressing the circumference of the outer peripheral surface of the inlet pipe 10 has the same configuration as the above-described embodiment.

Figure 23:
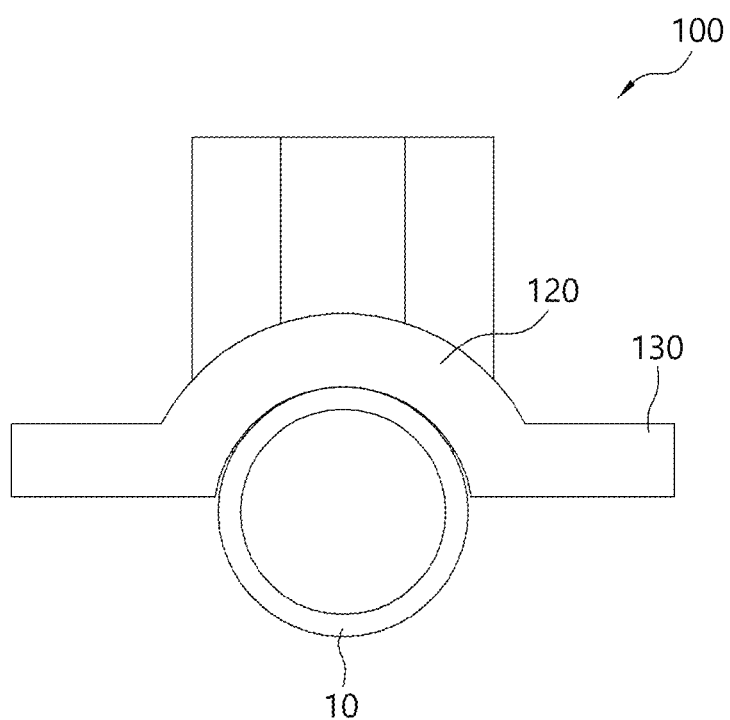
FIG. 23 is a front view of the coupling assembly according to still another embodiment of the present invention.
Figure 24:
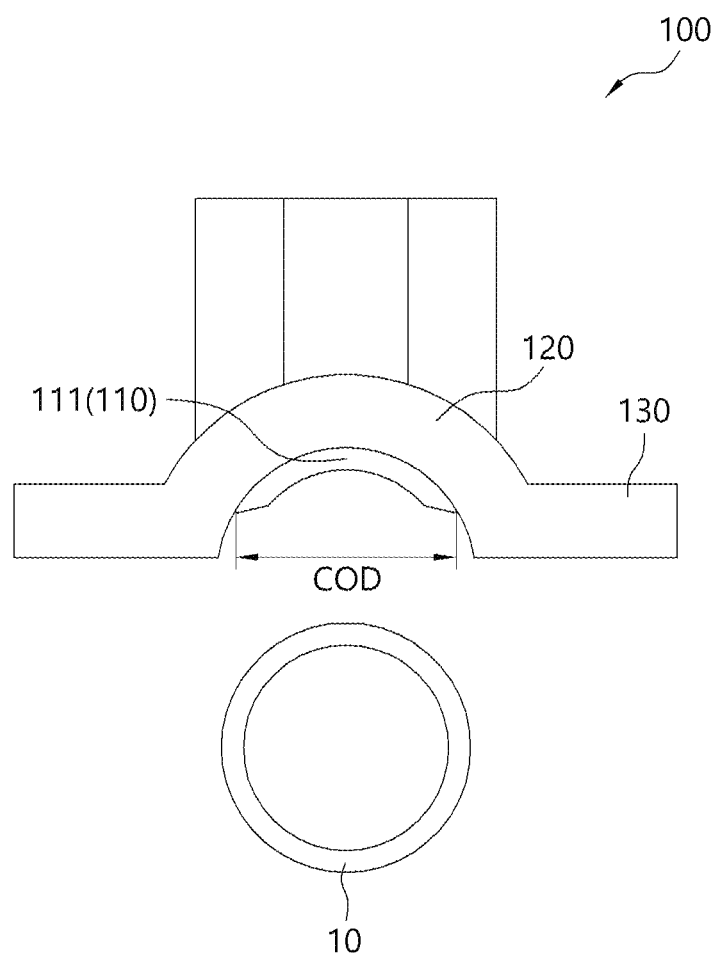
FIG. 24 is an exploded perspective view of the coupling assembly according to still another embodiment of the present invention.
Figure 25:
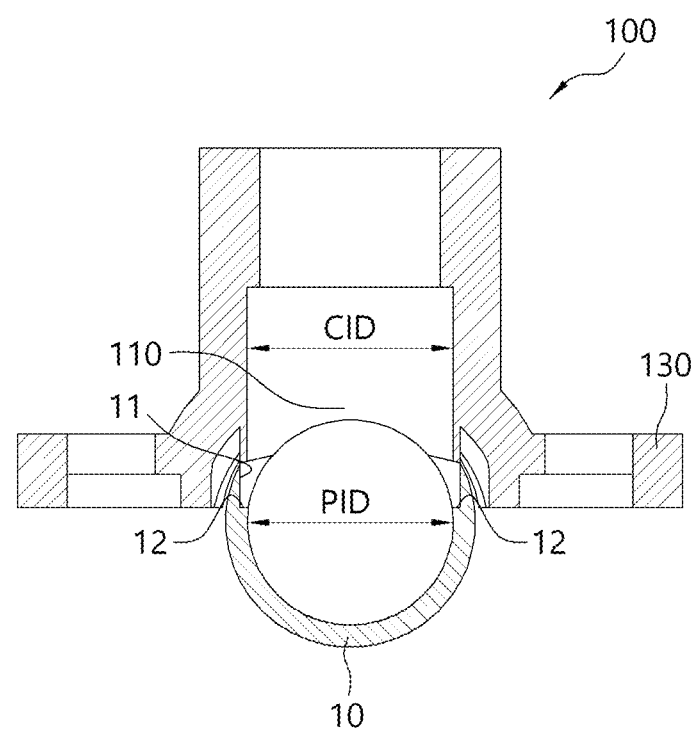
FIGS. 25 and 26 are cross-sectional views illustrating a state in which the coupling assembly according to still another embodiment of the present invention is cut along the radial direction of an inlet pipe.
Figure 26:
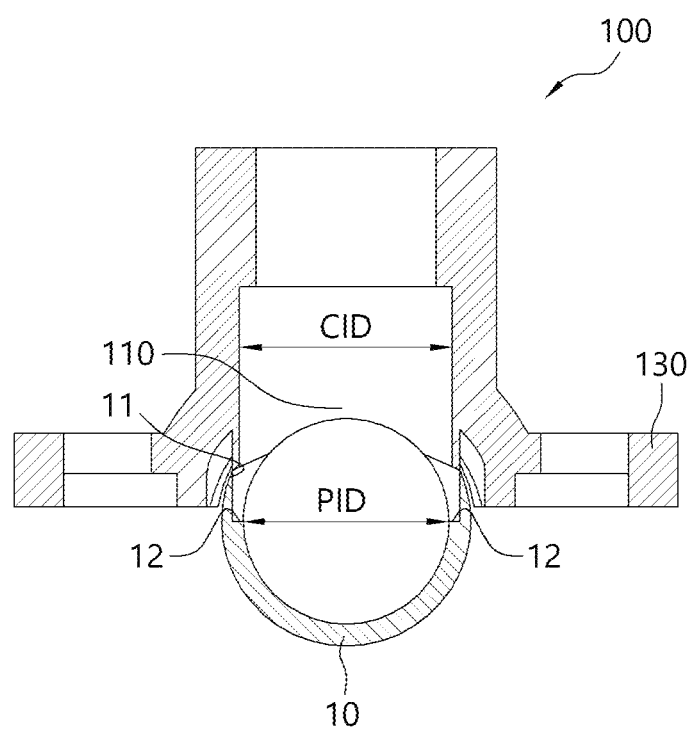
Figure 27:
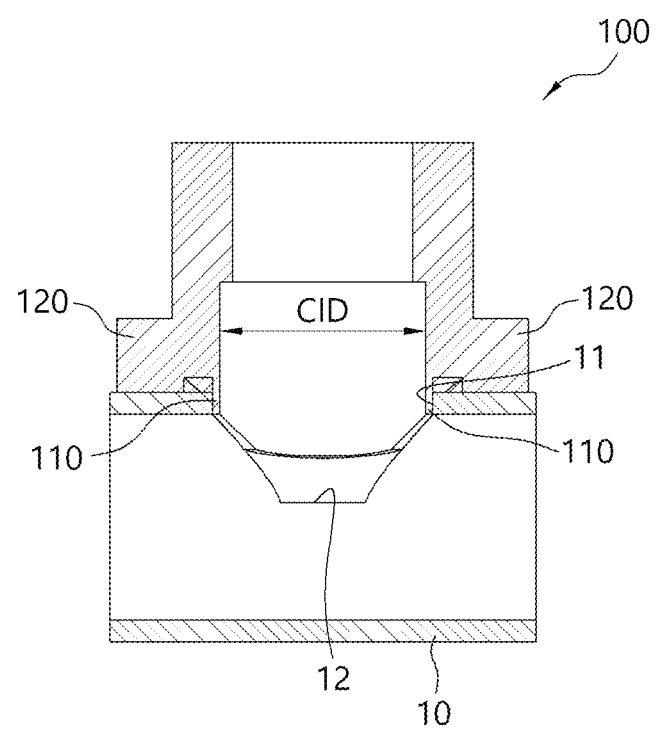
FIG. 27 is a cross-sectional view illustrating a state in which the coupling assembly according to still another embodiment of the present invention is cut along the axial direction of an inlet pipe.

FIG. 23 is a front view of the coupling assembly according to still another embodiment of the present invention, FIG. 24 is an exploded perspective view of the coupling assembly according to still another embodiment of the present invention, FIGS. 25 and 26 are cross-sectional views illustrating a state in which the coupling assembly according to still another embodiment of the present invention is cut along the radial direction of an inlet pipe, and FIG. 27 is a cross-sectional view illustrating a state in which the coupling assembly according to still another embodiment of the present invention is cut along the axial direction of an inlet pipe.

As illustrated in FIGS. 23 and 24, the coupler 100 is formed with an extension portion 110 that penetrates the branch hole 11 and is inserted into the inlet pipe 10.

In this case, as illustrated in FIG. 25, the inner diameter (CID) of the extension portion 110 is the same as the inner diameter (PID) of the inlet pipe 10, or as illustrated in FIG. 26, it may be formed to be greater than the inner diameter (PID) of the inlet pipe 10.

That is, as described above, since construction is possible by simply fastening the coupler 100 to the inlet pipe 10, assembly man-hours and construction costs are reduced, and further, in accordance with the UL (Underwriters Laboratories) standards, in order to use the branch pipe 20 having the same inner diameter as the inlet pipe 10, the inner diameter at the part branching from the inlet pipe 10 must be formed to be the same as the inner diameter of the inlet pipe 10, and since the inner diameter (CID) of the inlet pipe 110 is the same as the inner diameter (PID) of the inlet pipe 10 or is formed to be greater than the inner diameter (PID) of the inlet pipe 10, not only can the UL standards be satisfied even when a branch pipe 20 having the same inner diameter as the inlet pipe 10 is used, but also the branched fluid may flow more smoothly such that it is possible to secure a sufficient flow inside the branch pipe 20.

In this case, the configuration in which the outer diameter (COD) of the extension portion 110 is formed to be greater than the inner diameter (PID) of the inlet pipe 10, and the inner diameter (HID) of the branch hole 11 is formed to be the same as the outer diameter (COD) of the extension portion 110 has the same configuration as the above-described embodiment.

In addition, as described above, on the inner peripheral surface of the inlet pipe 10, an insertion groove 12 having the same inner diameter has the inner diameter of the branch hole 11 is formed along the insertion direction of the extension portion 110, and since the extension portion 110 is inserted and supported in the insertion groove 12 while penetrating the branch hole 11 formed in the inlet pipe 10, it is possible to effectively prevent fluid leakage and secure a stable support structure.

In this case, the support surface 111 includes a first support surface disposed oppositely in the radial direction of the inlet pipe 10 to be inserted and supported in the insertion groove 12, and a second support surface disposed oppositely in the axial direction of the inlet pipe 10 to be closely supported on the inner peripheral surface of the branch hole 11, and the first support surface is formed to a minimum size to prevent leakage of a branched fluid and to support an external force, and the second support surface is formed to a sufficient size. The first support surface and the second support surface may be integrally formed to extend, and when configured in this way, since the first support surface and the second support surface are continuously connected to the inner peripheral surface of the branch hole 11 and the insertion groove 12, not only is possible to effectively prevent fluid leakage during branching, but also the weight of the extension portion 110 is reduced such that it is possible to reduce the overall weight.

In addition, as illustrated in FIG. 27, the configuration in which the coupler 100 is formed with a reinforcing bar 120 for pressing the circumference of the outer peripheral surface of the inlet pipe 10 has the same configuration as the above-described embodiment.

Figure 28:
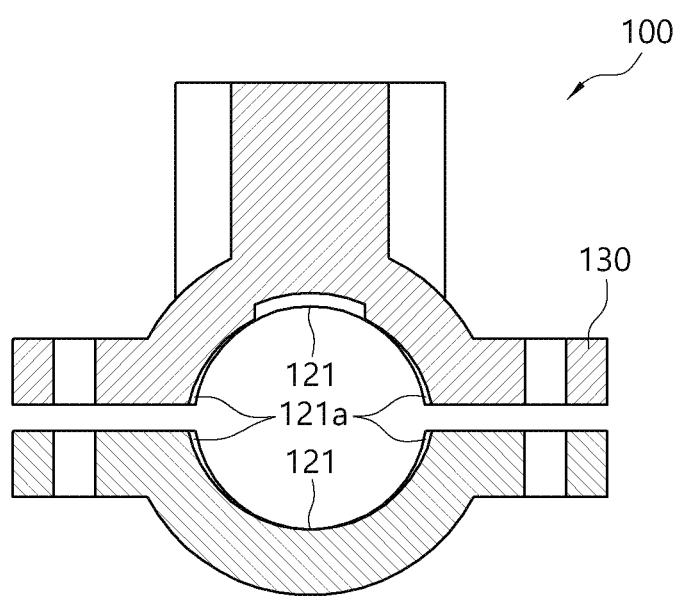
FIG. 28 is a cross-sectional view of a reinforcing bar of the coupling assembly according to still another embodiment of the present invention.

FIG. 28 is a cross-sectional view of a reinforcing bar of the coupling assembly according to still another embodiment of the present invention.

The above-described reinforcing bar 120 is formed with a pressing surface 121 for pressing the circumference of the outer peripheral surface of the inlet pipe 10 and is configured to press the above-described extension rib. Moreover, support walls 121*a* protruding in the radial direction of the inlet pipe 10 may be formed on both sides of the pressing surface 121 formed on the reinforcing bar 120. That is, as illustrated in FIG. 28, such a support wall 121*a* is not formed on the upper portion of the pressing surface 121, and thus, when the coupler 100 is mounted, since the gasket can be pressed until the upper portion of the pressing surface 121 contacts the outer peripheral surface of the inlet pipe 10, even if the size of the branch hole 11 is formed to be greater than the inner diameter (PID) of the inlet pipe 10, it is possible to effectively prevent fluid leakage.

On the other hand, support walls 121*a* protruding in the radial direction of the inlet pipe 10 may be formed on both sides of the pressing surface 121. That is, when the coupler 100 is mounted, the part where the support wall 121*a* is formed presses the gasket only until the support wall 121*a* comes into contact with the outer peripheral surface of the inlet pipe 10. In this case, the support wall 121*a* supports the extension rib of the gasket even when pressure is applied due to the fluid flow to prevent the gasket from separating to the outside, as well as preventing the extension rib from being exposed to the outside to effectively prevent deterioration of the durability of the gasket.

That is, since the support wall 121*a* is not formed on the upper portion of the pressing surface 121, the gasket is sufficiently pressed to effectively prevent fluid leakage around the branch hole 11, and the support walls 121*a* are formed on both sides of the pressing surface 121 such that the degree of pressing of the gasket may be partially reduced, but since it is a part spaced apart from the branch hole 11 by a certain distance, it is possible to effectively prevent fluid leakage even when the degree of pressing is reduced in this way, as well as to prevent separation of the gasket and outside exposure of the gasket.

Although an embodiment of the present invention has been described above, the spirit of the present invention is not limited to the embodiment presented in the present specification, and those skilled in the art who understand the spirit of the present invention will be able to easily suggest other embodiments by modifying, changing, deleting or adding components within the scope of the same spirit, but this is also said to be within the scope of the present invention.

The invention claimed is:

1. A coupling assembly, comprising:
    an inlet pipe having a branch hole for branching an inflowing fluid;
    a branch pipe in communication with the inlet pipe to allow a fluid branched through the branch hole to flow therethrough; and
    a coupler which interconnects the inlet pipe and the branch pipe,
    wherein the coupler has an extension portion which passes through the branch hole and is inserted into the inlet pipe, and an inner diameter of the extension portion is the same as an inner diameter of the inlet pipe or greater than the inner diameter of the inlet pipe, and
    wherein an insertion groove is formed along an insertion direction of the extension portion on an inner peripheral surface of the inlet pipe and has the same inner diameter as an inner diameter of the branch hole.

2. The coupling assembly of claim 1, wherein a support surface which is supported by the inner peripheral surface of the branch hole is formed on an outer peripheral surface of the extension portion.

3. The coupling assembly of claim 2, wherein an outer diameter of the extension portion is formed to be greater than the inner diameter of the inlet pipe, and the inner diameter of the branch hole is formed to be the same as the outer diameter of the extension portion.

4. The coupling assembly of claim 2, wherein the support surface is inserted and supported in the insertion groove.

5. The coupling assembly of claim 4, wherein the coupler is formed with a reinforcing bar for pressing a circumference of the outer peripheral surface of the inlet pipe.

6. The coupling assembly of claim 5, wherein the reinforcing bar is formed with a pressing surface for pressing the circumference of the outer peripheral surface of the inlet pipe, and support walls that protrude in a radial direction of the inlet pipe are formed on both sides of the pressing surface.

7. The coupling assembly of claim 4, wherein the support surface comprises a first support surface disposed oppositely in a radial direction of the inlet pipe to be inserted and supported in the insertion groove, and a second support surface disposed oppositely in an axial direction of the inlet pipe to be closely supported on the inner peripheral surface of the branch hole.

8. The coupling assembly of claim 7, wherein the first support surface and the second support surface are integrally formed to extend.

9. The coupling assembly of claim 7, wherein the first support surface and the second support surface are spaced apart from each other.

* * * * *